United States Patent [19]

Schulz et al.

[11] Patent Number: 5,079,033

[45] Date of Patent: Jan. 7, 1992

[54] PROCESS AND APPARATUS FOR RESIN-COATING OF EXTRUSIONS

[75] Inventors: Stefan Schulz, Gröbenzell; Berthold H. Kegel, Kirchheim; Wolfgang Möhl, Munich, all of Fed. Rep. of Germany

[73] Assignees: Technics Plasma GmbH, Kirchheim; Krauss Maffei AG, Munich, both of Fed. Rep. of Germany

[21] Appl. No.: 452,579

[22] Filed: Dec. 19, 1989

[30] Foreign Application Priority Data

Dec. 21, 1988 [DE] Fed. Rep. of Germany ....... 3843098

[51] Int. Cl.$^5$ .............................................. B05D 3/06
[52] U.S. Cl. ........................................ 427/44; 427/38; 427/45.1; 118/50.1; 118/623; 118/718; 118/723; 422/186.03; 422/186.05
[58] Field of Search .................. 427/44, 45.1, 47, 294, 427/38, 39, 41; 118/620, 723, 718, 50, 50.1, 621, 623; 422/186.03, 186.05

[56] References Cited

U.S. PATENT DOCUMENTS

| 4,678,644 | 7/1987 | Fukuta et al. | 118/723 |
| 4,727,293 | 2/1988 | Asmussen et al. | 118/723 |
| 4,776,918 | 10/1988 | Otsubo et al. | 427/38 |
| 4,863,756 | 9/1989 | Hartig et al. | 427/47 |
| 4,876,983 | 10/1989 | Fukuda et al. | 427/47 |

FOREIGN PATENT DOCUMENTS

| 61-183463 | 8/1986 | Japan | 118/723 |
| 62-060876 | 3/1987 | Japan | 427/45.1 |

Primary Examiner—Shrive Beck
Assistant Examiner—Terry J. Owens
Attorney, Agent, or Firm—Kane, Dalsimer, Sullivan, Kurucz, Levy, Eisele and Richard

[57] ABSTRACT

An extrusion is coated with a resin by passing the extrusion continuously through a belt-shaped plasma formed by means of a stationary annular electron cyclotron resonance magnet which completely surrounds the extrusion. The resin coating is produced by plasma polymerization of a monomer using microwaves having a frequency of 2.45 GHz.

4 Claims, 1 Drawing Sheet

PROCESS AND APPARATUS FOR RESIN-COATING OF EXTRUSIONS

BACKGROUND OF THE INVENTION

1. Field o the Invention

The invention relates to coating substrates with polymer resins.

2. Description of Related Art

It is conventional to provide a coat of resin, or example by painting, on extrusions of, for example, plastics or metal, as are used, e.g. in buildings as windows or door sections.

it is also known to pass stripes continuously through a plasma treatment chamber, in which a plasma of a gas is generated by high frequency. Known apparatus of this type is available, for example, from Shine-Etsu Chemical Industry Co., Ltd., Japan. In connection with plasma polymerization, reference may be made to the German patent specification 31 47 986.3, 32 44 391.9, 33 16 693.5 and 34 089 837.7.

Hitherto it has not yet been possible to provide a uniform polymer coating on extrusions which, in cross-section, have corners, edges or recesses.

SUMMARY OF THE INVENTION

Therefore, according t one embodiment of the invention, a process for the resin-coating of extrusions is proposed, in which the extrusion is passed continuously through a reactor, in which a monomore is polymerised using a plasma generated by microwaves, and deposited on the extrusion.

According to a particular embodiment of the invention, the extrusion is passed into he reactor through a belt-shaped plasma. Such a belt-shaped plasma can be formed using a stationary ECR (electron cyclotron resonance) magnet which closedly surrounds the continuously moving extrusion.

DETAILED DESCRIPTION OF THE PREFERRED EMBODIMENTS O THE INVENTION

A further aspect of the invention provides apparatus for the resin-coating of extrusions, comprising the following components:

a coating reactor having two valves sealing the reactor against ambient pressure, an ECR magnet, which closedly surrounds the extrusion entering via one of the valves and exiting via the other valve, a quartz window for the introduction of microwaves and optionally means for the production and introduction of microwaves.

According to a particular embodiment, the CR magnet is annular.

The quartz window can be arch-, dome- or cup-shaped.

Suitable known apparatus for the continuous resin-coating are the apparatus marketed by Shine-Etsu Chemical Industry Co., Ltd., as given above. Further, in German Patent Application P 37 38 352.3, apparatus is described, in which a gas plasma is generated using means for the generation and introduction of microwaves. Reference o the published content f this state of the art is fully taken here.

Details of plasma polymerization, in particular for the choice of suitable monomers for resin-coating of extrusions, may be taken from German Patent Applications 31 47 986.3, 32 44 391.9, 33 16 693.5 and 34 08 837.7.

Figure 1:
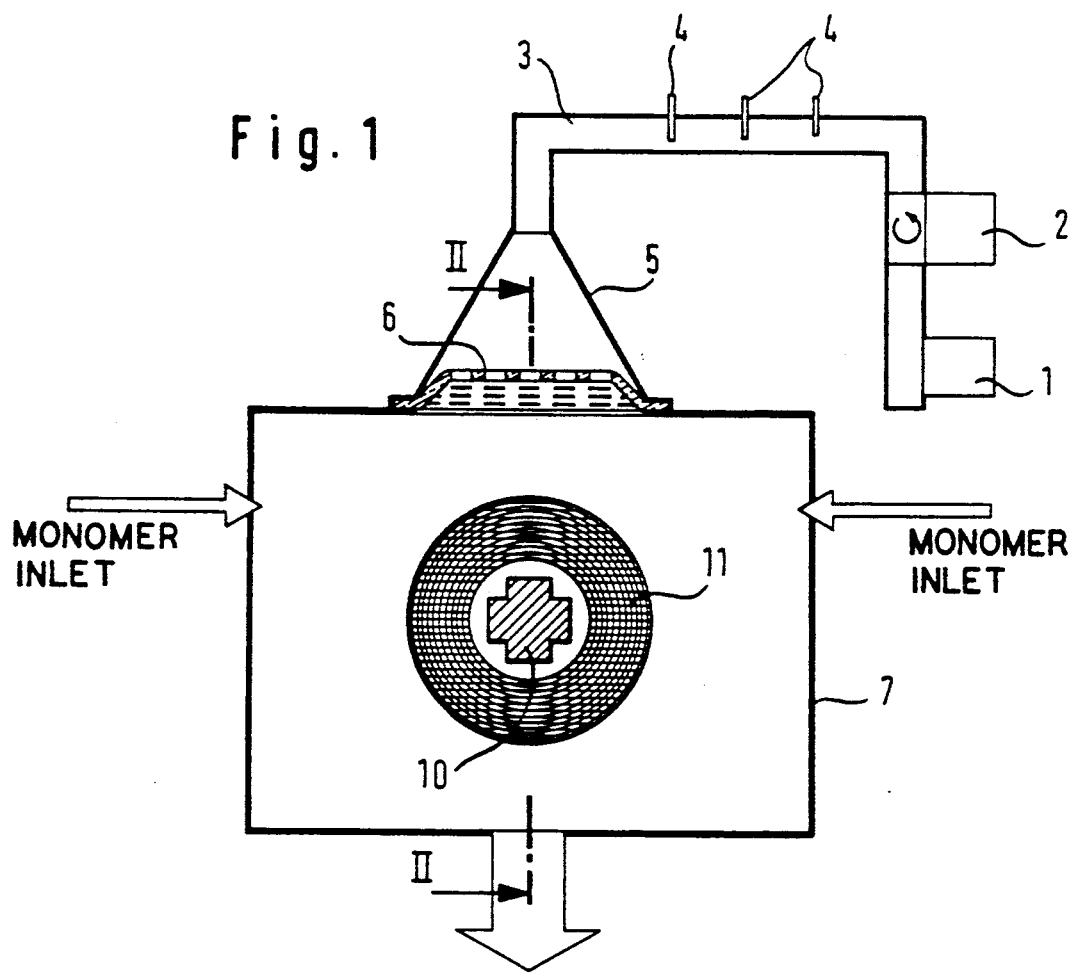
FIG. 1 is a schematic, partially cut-away view of an apparatus according to the invention.
Figure 2:
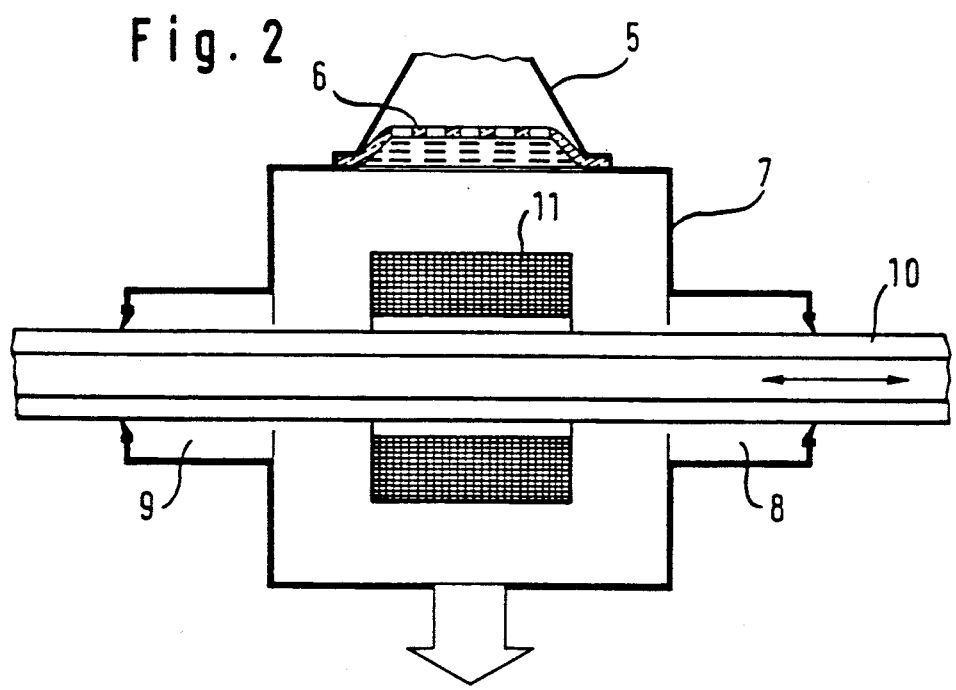
FIG. 2 is a section of the apparatus according to FIG. 1.

With respect to FIG. 1, microwaves having a frequency of, for example, 2.45 GHz are generated by a magnetron 1, and supplied by means of a a hollow conductor 3 and a circulator 2 to a horn radiator 5. The generated microwaves enter into a reactor 7 from the horn radiator 5 through a quartz dome 6. By means of tuning devices 4, the microwaves are tuned in resonance with the factor 7. The reactor 7 is connected (in a manner not shown in detail) to a vacuum pump (not shown(, so that reduced pressure, suitable for the formation of a gas plasma, is established in he reactor 7. Further, the reactor is provided with one or more inlets (not shown in detail) for the desired monomer. In the reactor, an ECR magnet (solenoid) 11 is provided, whose windings form a ring which allow ECR conditions to be established in the bore or in the inside of this ring, so that the monomer is polymerised only in tis bore. As shown in FIG. 2, the reactor is provided with valves 8, 9 which are in alignment with the bore of the ECR magnet 11. The valves 8, 9 may be formed (in manner not shown in detail) as lip seals by means of which an extrusion 10, for example for the preparation of window frames, can be introduced into the reactor, passed without contact through the bore of the ECR magnet and removed through he valve 9 located opposite the inlet valve 8.

Using the apparatus shown in FIGS. 1 and 2, polymethyl methacrylate was deposited on an aluminum section having a cross-shaped cross-section (Example 1).

The preceding example was repeated using hexamethyldisiloxane (HMDSO) (Example 2).

We claim:

1. A process for the resin coating an extrusion in a reactor, which comprises;

passing the extrusion continuously through a belt-shaped plasma formed by means of a stationary electron cyclotron resonance magnet which closedly surrounds the continuously moving extrusion; and in which a monomer is polymerized using a plasma obtained by microwaves having a frequency of 2.45 GHz, and deposited on he extrusion.

2. Apparatus for resin-coating an extrusion, which comprises;

a coating reactor having two valves sealing the reactor against ambient pressure;

an annular electron cyclotron resonance magnet which closedly surround the extrusion entering via one of said valves and exiting via the other of said valves; and a quartz window for the introduction of microwaves having a frequency 2.45 GHz.

3. Apparatus according to claim 2, characterized in that the quartz window is arch-, dome- or cup-shaped.

4. Apparatus according to claim 2 which further comprises means or the production and introduction of microwaves having a frequency of 2.45 GHz through the quartz window.

* * * * *

UNITED STATES PATENT AND TRADEMARK OFFICE
CERTIFICATE OF CORRECTION

PATENT NO. : 5,079,033
DATED : January 7, 1992
INVENTOR(S) : Stefan Schultz, Berthold H. Kegel, Wolfgang Mohl It is certified that error appears in the above-identified patent and that said Letters Patent is hereby corrected as shown below:

```
Col. 1, line 10; "or" should read -- for -- .
Col. 1, line 14; "it" should read -- It -- .
Col. 1, line 14; "stripes" should read -- strips -- .
Col. 1, line 20; "34 089 837.7" should read -- 34 08 837.7 -- .
Col. 1, line 27; "t" should read -- to -- .
Col. 1, line 30 "monomore" should read -- monomer -- .
Col. 1, line 34; "he" should read -- the -- .
Col. 1, line 60; "CR" should read -- ECR -- .
Col. 2, line 2; "o" should read -- to -- .
Col. 2, line 2; "f" should read -- of -- .
Col. 2, lines 7 and 8; between lines 7 and 8  insert -- An embodiment of the invention is described
           in more detail below with respect to two
           drawings.-- .

Col. 2, line 29; before the word "manner" insert -- a -- .
Col. 2, line 33; "he" should read -- the -- .
Col. 2, line 42; delete the word "the".

Col. 2, line 50; "he" should read -- the -- .
```

Signed and Sealed this

Eleventh Day of May, 1993

Attest:

MICHAEL K. KIRK

*Attesting Officer*    *Acting Commissioner of Patents and Trademarks*